United States Patent
Ballapalle et al.

(10) Patent No.: US 12,254,204 B2
(45) Date of Patent: Mar. 18, 2025

(54) DATA STORAGE DEVICE AND METHOD FOR HOST-CONTROLLED DATA COMPRESSION

(71) Applicant: Sandisk Technologies, Inc., Milpitas, CA (US)

(72) Inventors: Prabhakar Ballapalle, Bangalore (IN); ANup Srikanth, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/226,449

(22) Filed: Jul. 26, 2023

(65) Prior Publication Data

US 2024/0427513 A1 Dec. 26, 2024

Related U.S. Application Data

(60) Provisional application No. 63/522,870, filed on Jun. 23, 2023.

(51) Int. Cl.
  *G06F 3/06* (2006.01)

(52) U.S. Cl.
  CPC .......... *G06F 3/0644* (2013.01); *G06F 3/0607* (2013.01); *G06F 3/0679* (2013.01)

(58) Field of Classification Search
  CPC ..... G06F 3/0644; G06F 3/0607; G06F 3/0679
  See application file for complete search history.

(56) References Cited

U.S. PATENT DOCUMENTS

| | | | |
|---|---|---|---|
| 9,229,876 B2 | 1/2016 | Slepon | |
| 9,959,072 B2 | 5/2018 | Rostoker et al. | |
| 10,013,170 B1 | 7/2018 | Sahin et al. | |
| 10,203,897 B1 | 2/2019 | Cheah et al. | |
| 10,277,248 B2 | 4/2019 | Lee | |
| 10,678,436 B1 | 6/2020 | Jiang et al. | |
| 2007/0073941 A1 | 3/2007 | Brink et al. | |
| 2013/0205110 A1 | 8/2013 | Kettner | |
| 2015/0370488 A1* | 12/2015 | Watanabe | G06F 3/0608 711/103 |
| 2016/0188212 A1 | 6/2016 | Camp et al. | |
| 2019/0138439 A1* | 5/2019 | Kwak | G06F 3/0679 |
| 2019/0181881 A1* | 6/2019 | Matsuo | H03M 7/607 |
| 2019/0265914 A1* | 8/2019 | Schauer | G06F 13/4282 |
| 2022/0414061 A1* | 12/2022 | Memon | G06F 16/182 |

* cited by examiner

*Primary Examiner* — Jane W Benner
(74) *Attorney, Agent, or Firm* — Crowell & Moring LLP

(57) ABSTRACT

A data storage device and method are disclosed for host-controlled data compression. In one embodiment, a data storage device is provided comprising a memory and a controller configured to communicate with the memory. The controller is further configured to selectively compress target data, wherein the target data is only compressed in response to receiving a compression request from a host; receive the compression request from the host; and in response to receiving the compression request from the host, compress the target data. Other embodiments are disclosed.

16 Claims, 8 Drawing Sheets

DATA STORAGE DEVICE AND METHOD FOR HOST-CONTROLLED DATA COMPRESSION

CROSS-REFERENCE TO RELATED APPLICATION

This application claims priority to U.S. provisional patent application No. 63/522,870, filed Jun. 23, 2023, which is hereby incorporated by reference.

BACKGROUND

A host can retrieve data from and/or store data in a data storage device. Some data storage devices are configured to automatically compress data received from the host to efficiently utilize storage capacity of the data storage device's memory. The data storage device can perform data compression by encoding data that includes a first set of bits to generate a second set of bits, where the second set of bits includes fewer bits than the first set of bits. Generally, data compression removes redundant or unnecessary information from the data. Thus, compressed data is represented using fewer bits than were used to represent the original data. Accordingly, the compressed data can be stored in the memory using less of the memory's available storage capacity.

DETAIL DESCRIPTION

Figure 1A:
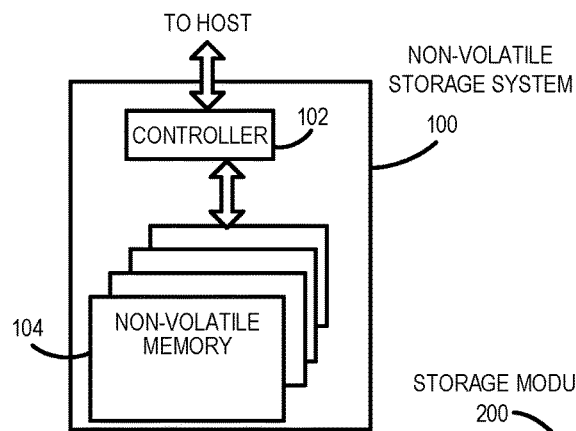
FIG. 1A is a block diagram of a data storage device of an embodiment.

The following embodiments generally relate to a data storage device and method for host-controlled data compression. In one embodiment, a data storage device is provided comprising a memory and a controller configured to communicate with the memory. The controller is further configured to selectively compress target data, wherein the target data is only compressed in response to receiving a compression request from a host; receive the compression request from the host; and in response to receiving the compression request from the host, compress the target data.

In some embodiments, the target data comprises data received from the host after the compression request was received.

In some embodiments, the target data comprises data previously written to the memory but not accessed in more than a threshold amount of time.

In some embodiments, the controller is further configured to store the compressed target data in a dedicated partition in the memory.

In some embodiments, the controller is further configured to store the compressed target data sequentially in the memory.

In some embodiments, the controller is further configured to decompress the compressed target data prior to receiving a read request for the target data.

In some embodiments, the target data is not associated with a read latency requirement.

In some embodiments, the data storage device is operating at a utilization above a threshold when the compression request is received.

In some embodiments, the compression request is received from the host as a vendor-specific command.

In some embodiments, the memory comprises a three-dimensional memory.

In another embodiment, a method is provided that is performed in a host in communication with a data storage device comprising a memory. The method comprises: determining whether data should be compressed by the data storage device, wherein the data storage device is configured to compress the data only in response to receiving an instruction from the host to compress the data; and in response to determining that the data should be compressed, sending the instruction to the data storage device to compress the data.

In some embodiments, the data is sent to the data storage device after sending the instruction to the data storage device.

In some embodiments, determining whether the data should be compressed comprises determining whether the data was not accessed in the memory more than a threshold amount of time.

In some embodiments, determining whether the data should be compressed comprises determining whether the data is associated with a read latency requirement.

In some embodiments, determining whether the data should be compressed comprises determining whether the data storage device is operating at a utilization above a threshold.

In some embodiments, the data storage device is configured to store the compressed data in a dedicated partition in the memory.

In some embodiments, the data storage device is configured to store compressed data sequentially in the memory.

In some embodiments, the data storage device is configured to decompress compressed data prior to receiving a read request for the data from the host.

In some embodiments, the instruction is sent to the data storage device as a vendor-specific command.

In another embodiment, a data storage device is provided comprising: a memory; and means for selectively compressing data only in response to receiving a compression request from a host.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
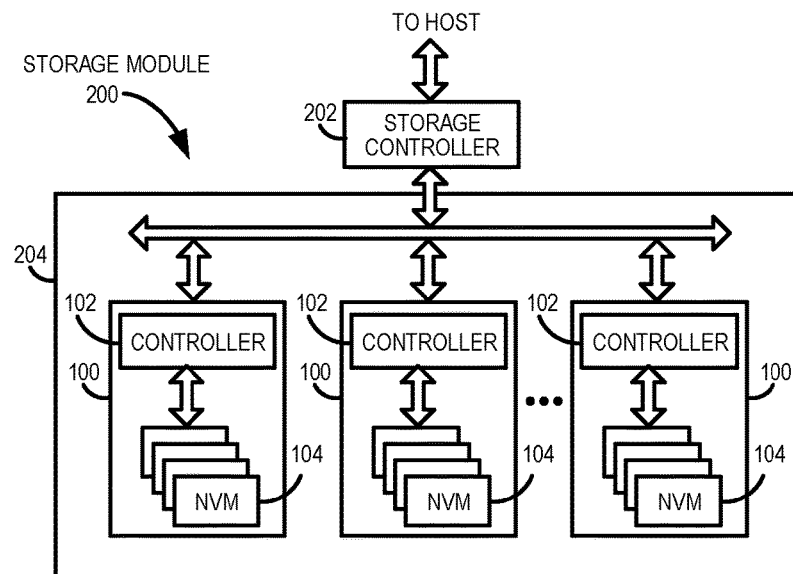
FIG. 1B is a block diagram illustrating a storage module of an embodiment.
Figure 1C:
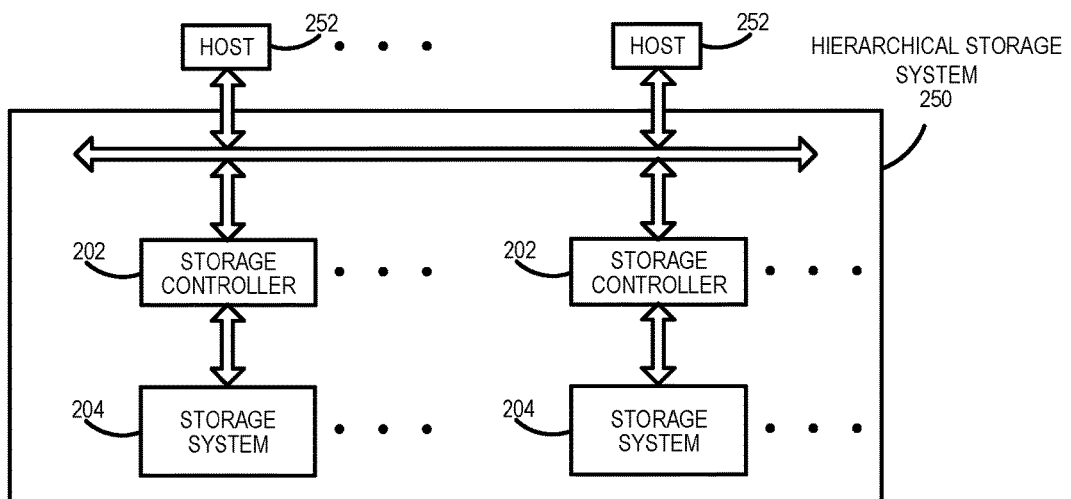
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Figure 2A:
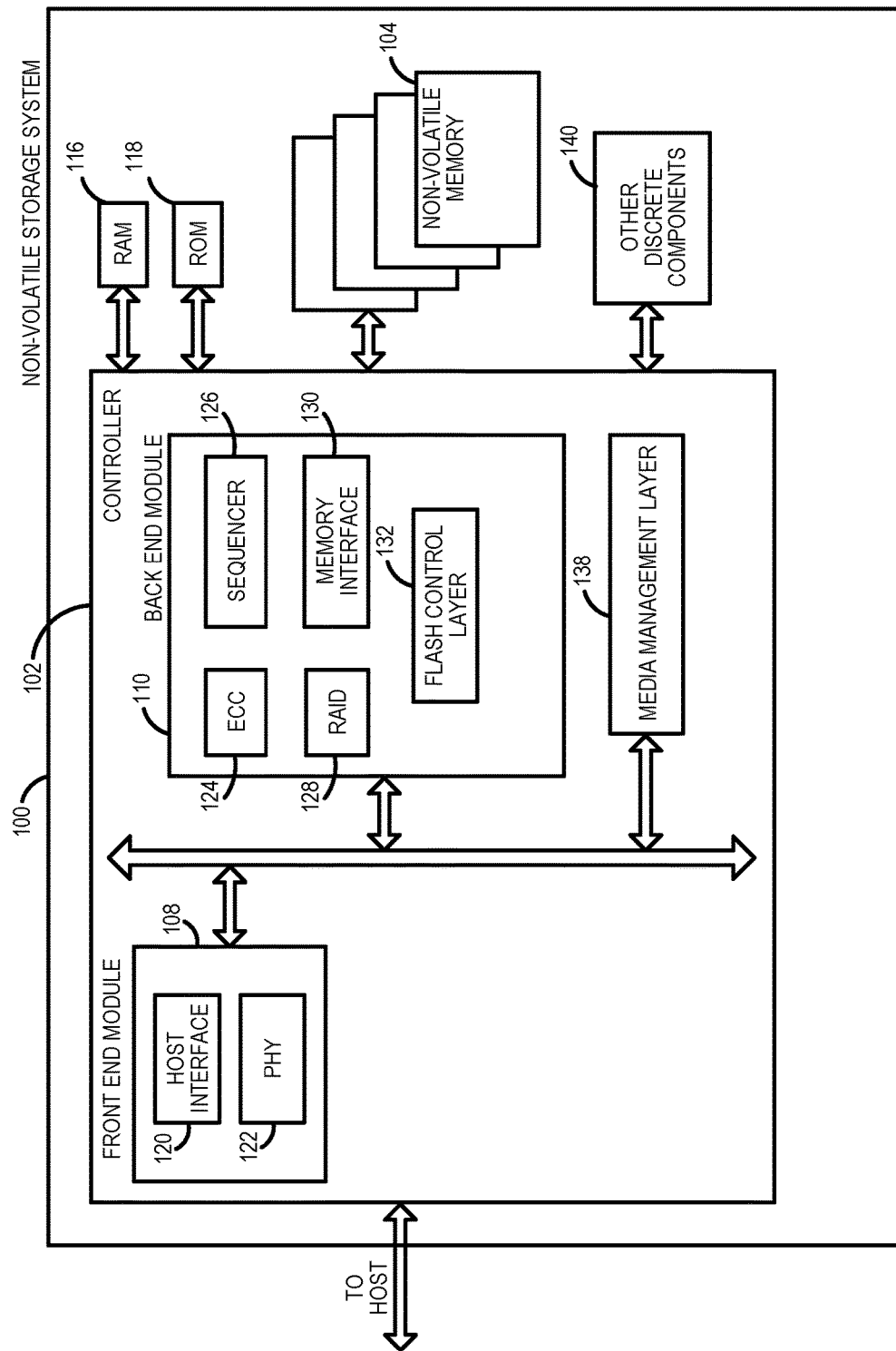
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro) processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
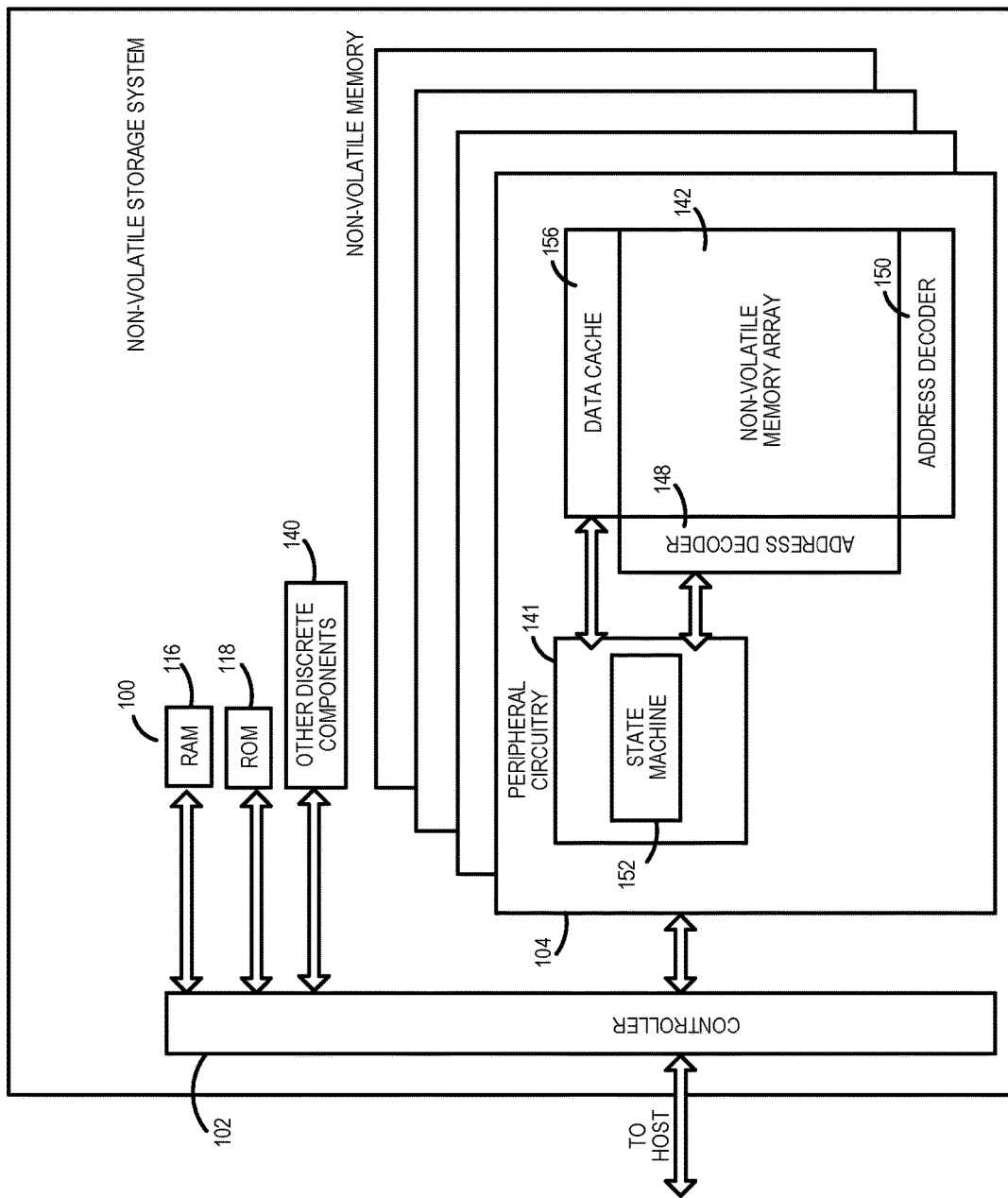
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
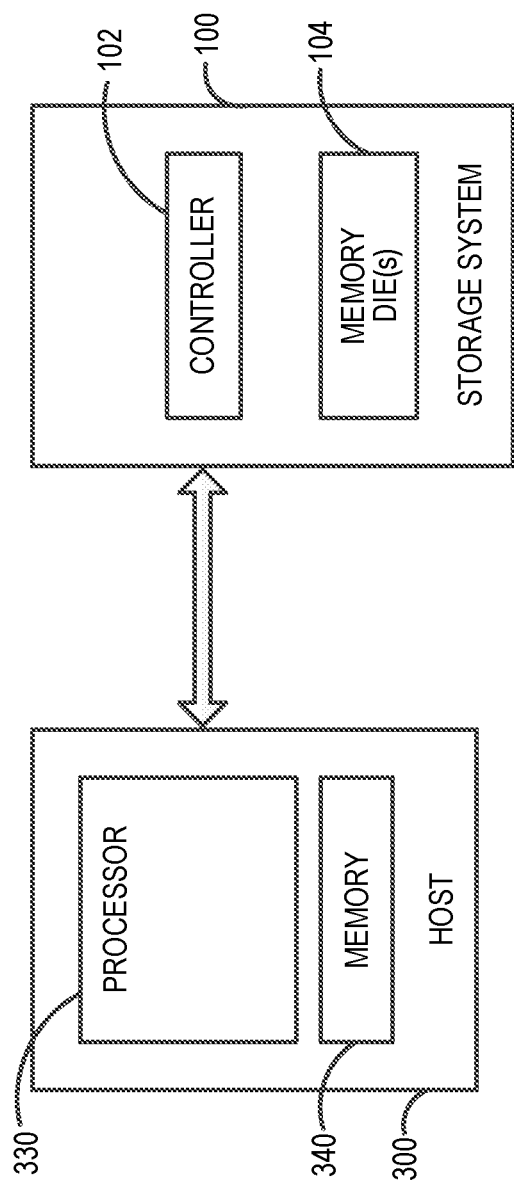
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 (which can be one or more processors) to perform the acts described herein. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, some data storage devices are configured to automatically compress data received from the host to efficiently utilize storage capacity of the data storage device's memory. The data storage device can perform data compression by encoding data that includes a first set of bits to generate a second set of bits, where the second set of bits includes fewer bits than the first set of bits. Generally, data compression removes redundant or unnecessary information from the data. Thus, compressed data is represented using fewer bits than were used to represent the original data. Accordingly, the compressed data can be stored in the memory using less of the memory's available storage capacity.

However, data compression and decompression takes time and consumes power, which can introduce additional computational overhead to the data storage device 100 and, thus, reduce the performance of both read and write operations. So, although data compression within the data storage device 100 can improve memory utilization, it can also reduce the overall performance of the data storage device 100. Nevertheless, data compression may still be desired in certain situations, such as when storing non-performance-critical data (i.e., data without a read latency requirement) and when the utilization of the data storage device 100 reaches a certain threshold.

To address this situation, in one embodiment, the host 300 can control when the data storage device 100 performs "in-drive" data compression. This control allows the host 300 to have flexibility of enabling data compression when reduced performance is acceptable (e.g., when storing non-performance-critical data (i.e., data without a read latency requirement) and when the utilization of the data storage device reaches a certain threshold). So, this embodiment can provide the host 300 with different levels of flexibility to decide which data the data storage device 100 will selectively compress. This means that the host 300 can choose to apply in-drive data compression only under certain conditions (e.g., high utilization of the data storage device 100 or for non-performance critical data). Also, since most standard interfaces to data storage devices provide a feature for a vendor-specific command, the host 300 can send the selective compression command to the data storage device 100 via a vendor-specific command without affecting the existing flows or breaking backward compatibility.

Figure 4:
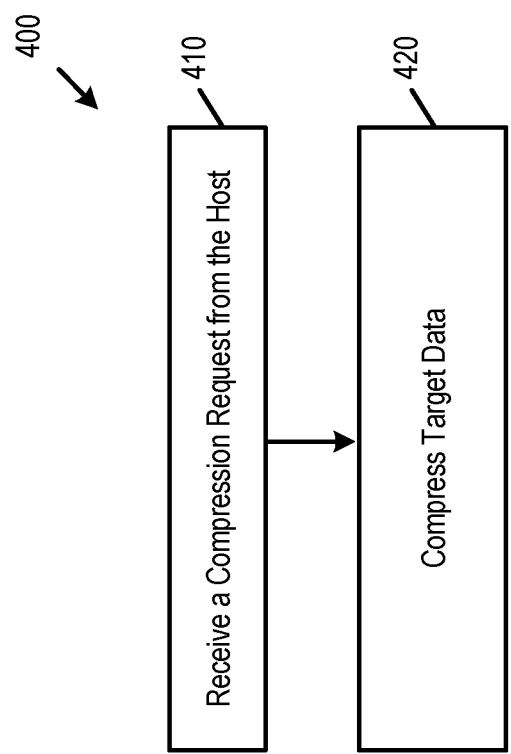
FIG. 4 is a flow chart of a method performed by a data storage device of an embodiment for host-controlled data compression.

Turning now to the drawings, FIG. 4 is a flow chart 400 of an example method performed by the controller 102 of the data storage device 100. In this example, the controller 102 of the data storage device 100 is configured to selectively compress target data only in response to receiving a compression request from the host 300. As shown in FIG. 4, in this method, the controller 102 of the data storage device 100 receives the compression request from the host 300 (e.g., as a vendor-specific command) (act 410) and, in response, compresses the target data (act 410).

Figure 5:
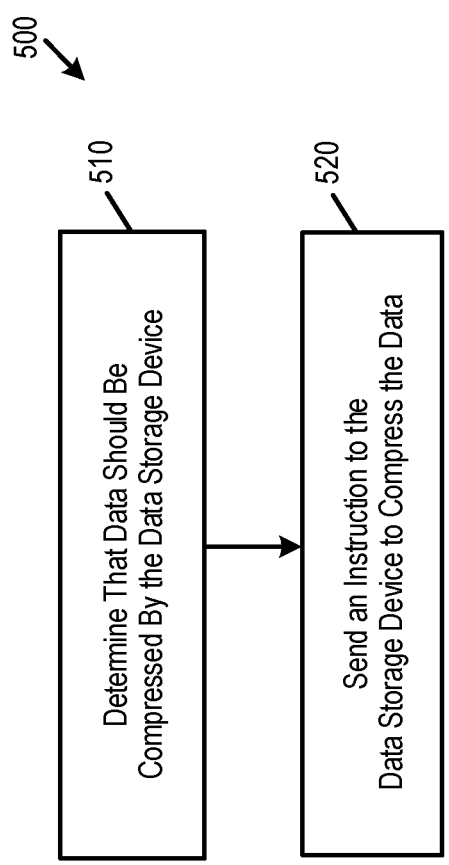
FIG. 5 is a flow chart of a method performed by a host of an embodiment for host-controlled data compression.

FIG. 5 is a flow chart 500 of an example method performed by the host 300. As shown in FIG. 5, in this example, the host 300 determines whether data should be compressed by the data storage device 100 (act 510). In response to determining that the data should be compressed, the host 300 sends an instruction to the data storage device to compress the data (act 320).

The target data that the controller 102 compresses in response to the host command can take any suitable form. For example, the target data can be "cold" data (e.g., data previously written to the memory 104 but not accessed in more than a threshold amount of time). As another example, the target data can be non-performance-critical data (i.e., data without a read latency requirement). As yet another example, the target data can be data (e.g., all data or selected data) received from the host 300 after the compression request was received. For instance, the host 300 can decide to send the compression request when the utilization of the data storage device 100 is above a threshold (e.g., 80%). In this situation, the decrease in performance due to compression would only be for newly-written data. So, the performance of the data storage device 100 would be unaffected for previously-written data (the improved utilization/reduced performance would only be associated with newly-written data).

After the data is compressed, the controller 102 in the data storage device 100 can store the data in the memory 104 in any suitable way. For example, in one embodiment, the controller 102 stores the compressed target data in a dedicated partition in the memory 104. In one example implementation, any data written to the partition can be compressed before writing the data, and any data read from the partition can be decompressed before returning the data to the host 300. For instance, multimedia data (e.g., a movie) that is read sequentially can be stored in a separate partition in the memory 104. During a read operation, data decompression can be performed ahead of the read request due to sequential access, hence minimizing the performance impact.

Figure 6:
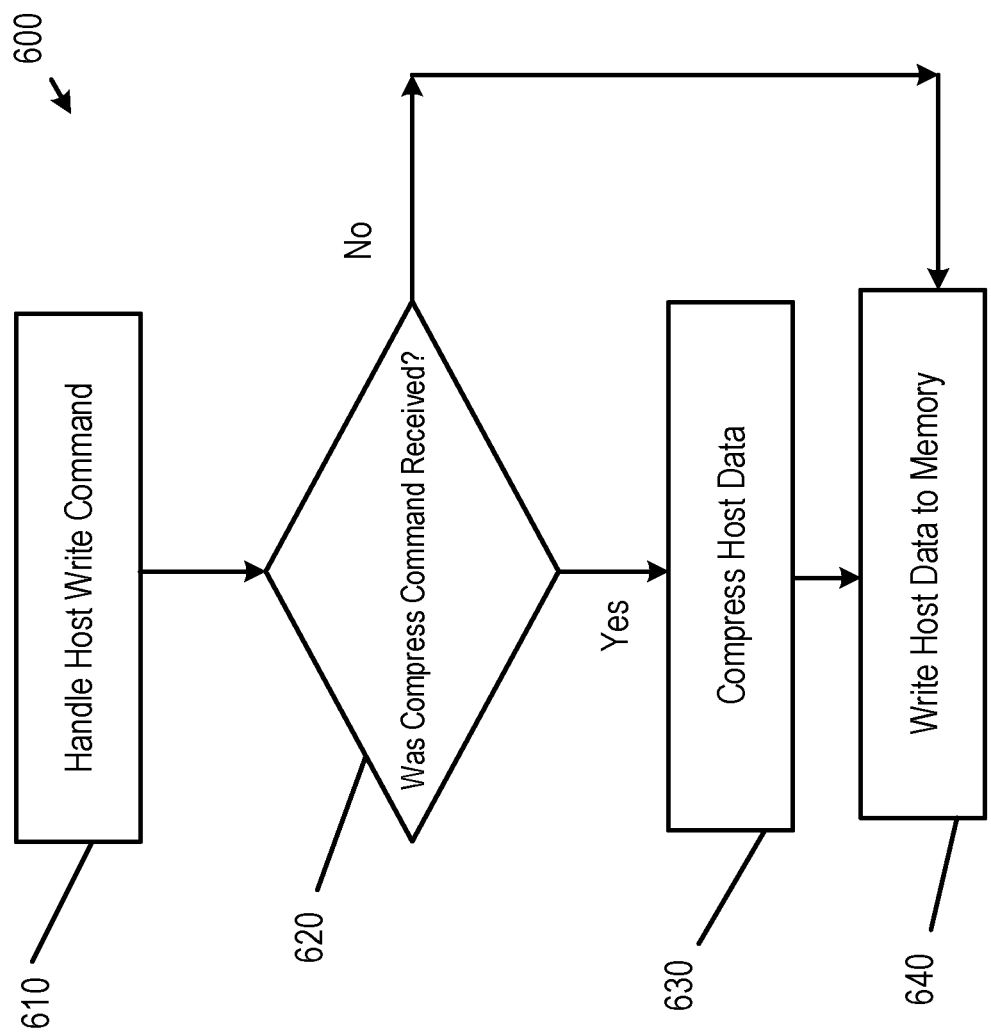
FIG. 6 is a flow chart of a method of an embodiment for performing a host write command.

Turning again to the drawings, FIG. 6 is a flow chart 600 of a method of an embodiment for performing a host write command. As shown in FIG. 6, in this method, to handle a host write command (act 610), the controller 102 in the data storage deice 100 determines if a compress command was received (act 620). If the compress command was received, the controller 102 compresses the host data (act 630) and writes the data to the memory 104 (act 640). If the compress command was not received, the controller 102 just writes the data to the memory 104 (act 640).

Figure 7:
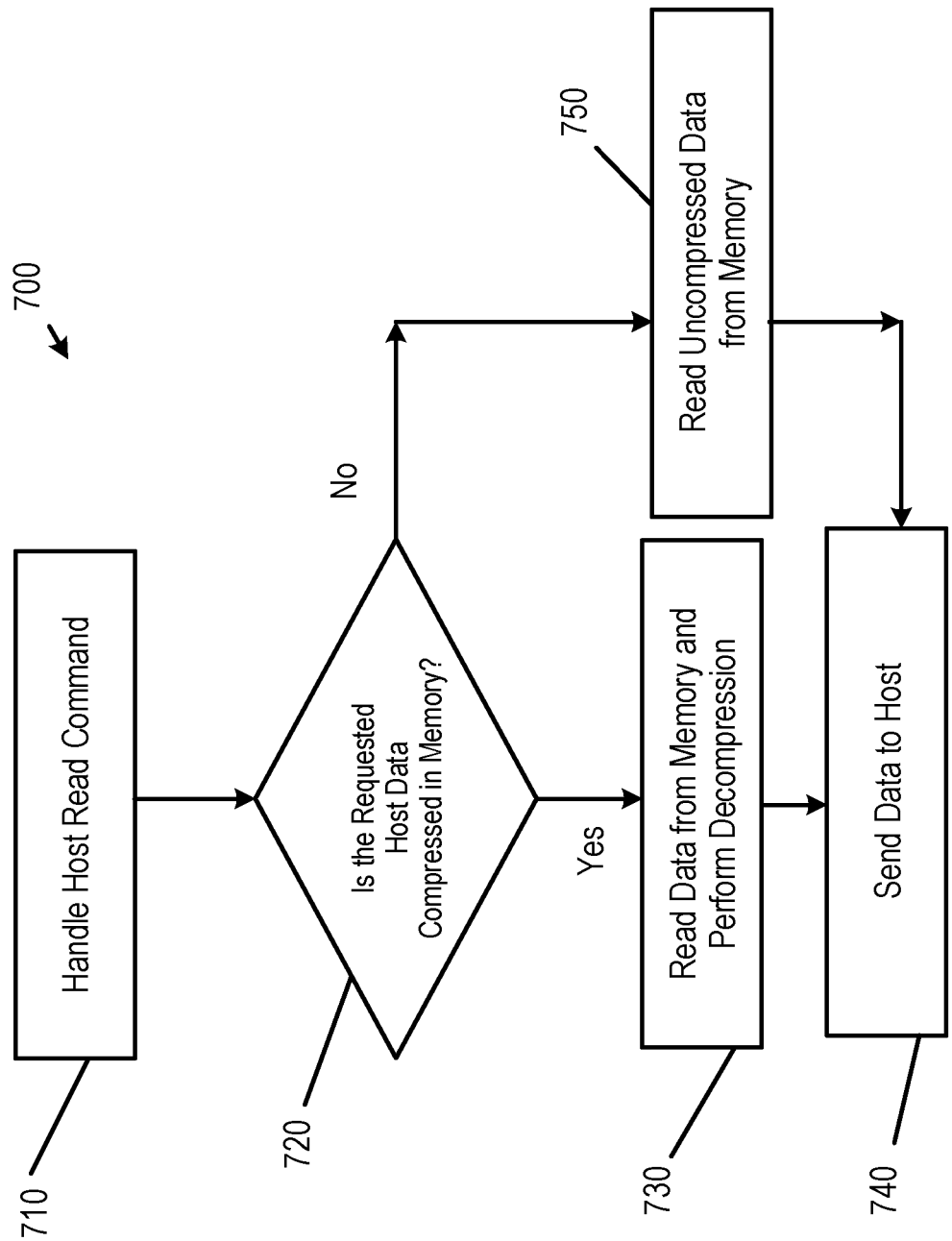
FIG. 7 is a flow chart of a method of an embodiment for performing a host read command.

FIG. 7 is a flow chart 700 of a method of an embodiment for performing a host read command. As shown in FIG. 7, in this method, to handle a host read command (act 710), the controller 102 in the data storage deice 100 determines if the requested host data is compressed in the memory 104 (act 720). If it is, the controller 102 reads the data from the memory 104 and decompresses it (act 730), after which the controller 102 sends the data to the host (act 740). If it is not, the controller 102 reads the uncompressed data from the memory 104 (act 750) and send the data to the host (act 740).

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
 a memory; and
 a processor configured to communicate with the memory and further configured to:
  receive, from a host, a write command comprising a logical address and data;
  receive, from the host, a vendor-specific command to compress the data, wherein the vendor-specific command is sent by the host in response to the host determining that the data storage device is operating at a utilization above a threshold; and
  in response to receiving the vendor-specific command, compress the data, wherein the data is only compressed in response to receiving the vendor-specific command from the host.

2. The data storage device of claim 1, wherein the data is received from the host after the vendor-specific command is received from the host.

3. The data storage device of claim 1, wherein the data comprises data previously written to the memory but not accessed in more than a threshold amount of time.

4. The data storage device of claim 1, wherein the processor is further configured to store the compressed data in a dedicated partition in the memory.

5. The data storage device of claim 1, wherein the processor is further configured to store the compressed data sequentially in the memory.

6. The data storage device of claim 1, wherein the processor is further configured to decompress the compressed data prior to receiving a read request for the data.

7. The data storage device of claim 1, wherein the data is not associated with a read latency requirement.

8. The data storage device of claim 1, wherein the memory comprises a three-dimensional memory.

9. A method comprising:
performing in a host in communication with a data storage device comprising a memory:
sending, to the data storage device, a write command comprising a logical address and data,
determining whether the data storage device is operating at a utilization above a threshold; and
in response to determining that the data storage device is operating at a utilization above the threshold, sending, to the data storage device, a vendor-specific command to compress the data, wherein the data storage device is configured to compress the data only in response to receiving the vendor-specific command.

10. The method of claim 9, wherein the data is sent to the data storage device after sending the vendor-specific command to the data storage device.

11. The method of claim 9, wherein the vendor-specific command is also sent in response to determining that the data was not accessed in the memory more than a threshold amount of times.

12. The method of claim 9, wherein the vendor-specific command is also sent in response to determining that the data is associated with a read latency requirement.

13. The method of claim 9, wherein the data storage device is configured to store the compressed data in a dedicated partition in the memory.

14. The method of claim 9, wherein the data storage device is configured to store the compressed data sequentially in the memory.

15. The method of claim 9, wherein the data storage device is configured to decompress the compressed data prior to receiving a read request for the data from the host.

16. A data storage device comprising:
a memory; and
means for:
receiving from a host, a write command comprising a logical address and data:
receiving, from the host, a vendor-specific command to compress the data wherein the vendor-specific command is sent by the host in response to the host determining that the data storage device is operating at a utilization above a threshold; and
in response to receiving the vendor-specific command, compressing the data, wherein the data is only compressed in response to receiving the vendor-specific command the host.

* * * * *